(12) United States Patent
Wadsworth

(10) Patent No.: US 7,787,503 B2
(45) Date of Patent: Aug. 31, 2010

(54) BROAD SPECTRUM LIGHT SOURCE

(75) Inventor: William Wadsworth, Bath (GB)

(73) Assignee: NKT Photonics A/S, Birkerod (DK)

( * ) Notice: Subject to any disclaimer, the term of this patent is extended or adjusted under 35 U.S.C. 154(b) by 995 days.

(21) Appl. No.: 10/583,961

(22) PCT Filed: Dec. 22, 2004

(86) PCT No.: PCT/EP2004/053653
§ 371 (c)(1), (2), (4) Date: Jun. 21, 2006

(87) PCT Pub. No.: WO2005/062113
PCT Pub. Date: Jul. 7, 2005

(65) Prior Publication Data
US 2009/0074023 A1    Mar. 19, 2009

(30) Foreign Application Priority Data
Dec. 22, 2003    (GB) ................................. 0329629.0

(51) Int. Cl.
*H01S 3/30* (2006.01)
(52) U.S. Cl. ......................................................... 372/6
(58) Field of Classification Search .................... 372/6; 385/125, 88–94, 33
See application file for complete search history.

(56) References Cited

U.S. PATENT DOCUMENTS 6,236,779 B1    5/2001  Kafka et al.
6,826,342 B1 *  11/2004  Bise et al. .................... 385/125
2002/0122644 A1 *  9/2002  Birks et al. .................. 385/125
2004/0017977 A1 *  1/2004  Lam et al. ...................... 385/49
2004/0028356 A1    2/2004  Birks et al.

FOREIGN PATENT DOCUMENTS

| DE | 102 20 871 A1 | 11/2003 |
| WO | WO 01/86347 A1 | 11/2001 |
| WO | WO 03/096490 A2 | 11/2003 |

OTHER PUBLICATIONS

Town, et al. "Optical supercontinuum generation from nanosecond pump pulses in an irregularly microstructured air-silica optical fiber," 2003, Appl. Physics, B 77, 235-238.*

Town G E et al: "Optical supercontinuum generation from nanosecond pump pulses in an irregularly microstructured air-silica optical fiber"; Applied Physics B, vol. B77, No. 2-3, Sep. 2003, pp. 235-238; Springer-Verlag Germany, ISSN: 0946-2171.

(Continued)

*Primary Examiner*—Minsun Harvey
*Assistant Examiner*—Patrick Stafford
(74) *Attorney, Agent, or Firm*—Buchanan Ingersoll & Rooney PC

(57) ABSTRACT

The light includes a laser (4), which operates at or near its fundamental wavelength and produces pulses of a duration longer than 0.5 ns, and a micro-structured optical fibre (9) arranged to guide the pulses, wherein the light is generated by the pulses in the fibre (9). The light source may e.g. be useful in applications such as spectral testing of fibre components and spectral analysis of chemical and biological samples.

20 Claims, 7 Drawing Sheets

OTHER PUBLICATIONS

Wadsworth W J et al: "Supercontinuum and four-wave mixing with Q-switched pulses in endlessly sigle-mode photonic crystal fibres", Optics Express, Opt. Soc. America USA, vol. 12. No. 2, Jan. 26, 2004, pp. 299-309; ISSN: 1094-4087.

Wadsworth W J et al: "Compact supercontinuum generation and four-wave mixing in PCF with 10ns laser pulses" (CLEO), Conference on San Francisco, CA, USA, May 20-21, 2004, IEEE, vol. 2, May 20, 2004, pp. 37-38, XP010744482.

Provino L et al: "Compact broadband continuum source based on microchip laser pumped microstructured fibre"; Electronics Letters, vol. 37, No. 9, Apr. 26, 2001, pp. 558-560; XP006016516.

Seefeldt M et al; "Compact white-light source with an average output power of 2.4 W and 99 nm spectral bandwidth"; Optics Communications, North-Holland Publishing Co., vol. 216, No. 1-3, Feb. 1, 2003, pp. 199-202; XP004404801.

D. Mogilevtsev, T.A. Birks and P.St.J. Russell, "Group-velocity dispersion in photonic crystal fibres," Opt. Lett., 23 (21), 1662-1664 (1998).

J.C. Knight, J. Arriaga, T.A. Birks, A. Ortigosa-Blanch, W.J. Wadsworth, P.St.J. Russell, "Anomalous dispersion in photonic crystal fibre," IEEE Photonic Technology Letters, 12, 807-809 (2000).

J.K. Ranka, R.S. Windeler and A.J. Stentz: "Visible continuum generation in air-silica microstructure optical fibres with anomalous dispersion at 800 nm," Opt. Lett, 25 (1), 25-27 (2000).

T.A. Birks, J.C. Knight, and P.St.J. Russell, "Endlessly single-mode photonic crystal fibre," Opt. Lett. 22, 961-963 (1997).

T.A. Birks, D. Mogilevtsev, J.C. Knight, P.St.J. Russell, J. Broeng, P.J. Roberts, J.A. West, D.C. Allan, and J.C. Fajardo, "The analogy between photonic crystal fibres and step index fibres," Optical Fibre Conference, Paper FG4-1, pp. 114-116, Friday, Feb. 26, 1999.

Schreiber et al., pp. 71-78, Opt. Comm. vol. 228 (2003).

Coen et al., pp. 1356-1358, Opt. Lett., vol. 26 (2006).

Dudley et al., pp. 765-771, J. Opt. Soc. Am. B, vol. 19 (2002).

J.D. Harvey, R. Leonhardt, K.L.G. Wong, J.C. Knight, W.J. Wadsworth and P.St.J. Russell, "An optical parametric oscillator in the visible using PCF," CLEO 2003, paper CMR3 (2003).

Bjarklev, Broeng and Bjarklev in "Photonic Crystal Fibers", Kluwer Academic Press, 2003, chapter 4, pp. 115-130.

International Search Report from PCT/EP2004/053653.

Search Report from GB 0329629.0.

International Preliminary Patentability Report from PCT/EP2004/053653.

* cited by examiner a)

a)

b)

b)

a)

b)

a)

b)

BROAD SPECTRUM LIGHT SOURCE

TECHNICAL FIELD

This invention relates to the field of light sources and in particular to sources of light of wavelengths extending across a broad spectrum of hundreds of nanometers.

BACKGROUND ART

There has been much interest in recent years in nonlinear interactions in optical fibres. The low nonlinearity of, for example, silica glass is offset by long interaction lengths and high power density in fibre to yield spectacular nonlinear effects. For most nonlinear processes the physical fibre length can be made longer than the effective interaction length, which is governed by phase matching, pulse broadening, walk-off and attenuation. In particular, the fibre dispersion plays a key role in short pulse propagation and in phase matching conditions for nonlinear processes.

In the spectral region beyond 1300 nm, where the material dispersion of silica glass is itself anomalous, fibres can be designed and made to have a modal dispersion which is normal or anomalous, with a zero dispersion at any given wavelength (for example the dispersion shifted fibres used in telecommunications systems). It is not possible, however, to move the zero dispersion wavelength, $\lambda_0$, of a silica step-index single-mode optical fibre to wavelengths shorter than 1270 nm, the zero dispersion wavelength of bulk silica.

Photonic crystal fibres (PCFs, also known as micro-structured fibres or holey fibres) are a relatively new kind of optical fibre. A PCF comprises a cladding region, formed from solid matrix material defining a plurality of elongate holes, and a core region. PCFs can guide light in their core region by a number of mechanisms, including total internal reflection at the interface between the core and cladding region. Even if a PCF is made from a single solid material, the holes in the cladding region lower the effective refractive index of the cladding, providing a refractive index step between a solid core and the cladding region and enabling total internal reflection of guided light. In photonic crystal fibres, it is possible to shift the zero dispersion wavelength of single-mode silica fibres to much shorter wavelengths (See for example D. Mogilevtsev, T. A. Birks and P. St. J. Russell, "Group-velocity dispersion in photonic crystal fibres," Opt. Lett., 23 (21), 1662-1664 (1998), J. C. Knight, J. Arriaga, T. A. Birks, A. Ortigosa-Blanch, W. J. Wadsworth, P. St. J. Russell, "Anomalous dispersion in photonic crystal fibre," IEEE Photonic Technology Letters, 12, 807-809 (2000) and J. K. Ranka, R. S. Windeler and A. J. Stentz: "Visible continuum generation in air-silica microstructure optical fibres with anomalous dispersion at 800 nm," Opt. Lett, 25 (1), 25-27 (2000)). This has been exploited to dramatic effect in supercontinuum generation in small-core, high-index contrast PCF with zero dispersion wavelengths in the region 580-900 nm pumped with modelocked Ti:sapphire lasers at 750-850 nm. Though these fibres are typically not strictly single-mode, higher order modes are difficult to excite and are also not coupled to the fundamental mode by normal bending, so the fibres may be used as if single mode.

Not only can strictly single-mode PCFs be fabricated, but also so-called endlessly single-mode PCFs which support only one guided mode over all wavelengths (See for example T. A. Birks, J. C. Knight, and P. St. J. Russell, "Endlessly single-mode photonic crystal fibre," Opt. Lett. 22, 961-963 (1997) and T. A. Birks, D. Mogilevtsev, J. C. Knight, P. St. J. Russell, J. Broeng, P. J. Roberts, J. A. West, D. C. Allan, and J. C. Fajardo, "The analogy between photonic crystal fibres and step index fibres," Optical Fibre Conference, Paper FG4-1, pages 114-116, Friday, Feb. 26, 1999).

Schreiber et al. describe at pp 71-78, Opt. Comm. Vol. 228 (2003) generation of a supercontinuum spectrum from PCF by pumping with picosecond pulses from an ytterbium-doped fibre amplifier operating at 1040 nm.

Town et al. describe at pp 235-238, Appl. Phys. B—Lasers and Optics, Vol. 77 (2003) generation of a supercontinuum spectrum from a randomly micro-structured air-silica optical fibre, by pumping with nanosecond pulses from a Q-switched Nd:YAG laser.

Coen et al. describe at pp 1356-1358, Opt. Lett., Vol. 26 (2001) generation of a supercontinuum from a PCF by pumping with 60 ps pulses at 675 W peak power from a Kr-ion laser operating at 647 nm.

Dudley et al. describe at pp 765-771, J. Opt. Soc. Am. B, Vol. 19 (2002) generation of a supercontinuum from air-silica micro-structured fibre by pumping with pulses of 0.8 ns duration from a frequency-doubled, Q-switched Nd:YAG microchip laser operating at 532 nm.

OBJECTS AND SUMMARY

An object of the invention is to provide a relatively compact and inexpensive source of light of wavelengths spread over a broad spectrum.

According to an embodiment of the invention there is provided a source of light of a spectrum of wavelengths extending over more than 300 nm, comprising a laser, which operates at or near its fundamental wavelength and produces pulses of a duration longer than 0.5 ns, and a micro-structured optical fibre arranged to guide the pulses, wherein the light is generated by the pulses in the fibre.

The spectrum may be a supercontinuum spectrum, with light at substantially all wavelengths over the 300 nm or it may be a spectrum comprising light only at a few widely spaced wavelengths, together extending over 300 nm. In that case, the spectrum may be produced by four-wave mixing (FWM). Thus the source may be a source for generating light by FWM in the micro-structured fibre and the light produced may be substantially at the FWM wavelengths. We have made the surprising discovery that FWM peaks are sufficiently efficiently generated in the micro-structured fibre by relatively long pulses for the FWM peaks to be useful. We have also discovered that the FWM peaks are not significantly broadened at high powers. The laser may be a solid-state laser utilising a gain crystal such as ND:YAG, Nd:YLF or Ti:sapphire. The laser may be Q-switched. The laser may be a monolithic laser. In monolithic lasers, such as a microchip laser or a non-planar ring laser, resonator mirrors are coated directly onto a laser gain crystal. The laser is generally pumped by one or more diode lasers.

Microchip lasers are significantly cheaper and more compact than mainframe lasers such as Kr-ion lasers.

The laser operates at or near its fundamental wavelength, as opposed to being frequency doubled; in the prior art microchip lasers that have been used to pump PCF have been frequency doubled. It is surprising that generation of a very broad spectrum can be achieved at microchip laser fundamental wavelengths, for example of 1000 nm to 1100 nm.

It is particularly surprising that long pulses at this wavelength may be used to produce a broad spectrum. The pulses of light may be of a duration of more than 500 ps, more than 1 ns, more than 2 ns, more than 3 ns, more than 4 ns, more than 5 ns or even more than 10 ns.

It is also particularly surprising that pulses of relatively low peak power may be used to produce a broad spectrum. The pulses may have a peak power of less than 50 kW, less than 20 kW, less than 15 kW, less than 10 kW, less than 9 kW, less than 3 kW or even less than 1 kW.

Another indication of the relative difficulty with which a broad spectrum is produced is given by the product of the pulse peak power and the interaction length of the pulse in the fibre (that is, the length the pulse travels before dispersion separates it from the light it is generating sufficiently to stop multi-wave interactions; the magnitude of the interaction length may or may not be calculated taking into account the effects of fibre loss.). We have discovered that a broad spectrum may be produced when the peak power times the interaction length is less than 2 kWm, less than 1 kWm or even less than 500 μm.

We have discovered that still broader spectra may be produced, thus the spectrum may extend over more than 500 nm or more than 700 nm.

The fundamental wavelength may be longer than 600 nm. The fundamental wavelength may be in the range 1000 nm to 1100 nm.

The micro-structured optical fibre has a zero dispersion wavelength $\lambda_0$. The operating wavelength of the laser may be less than the zero dispersion wavelength. In that case, the broad spectrum will in general be produced by four-wave mixing.

Alternatively, the operating wavelength of the laser may be greater than the zero dispersion wavelength. In that case, the broad spectrum will in general be produced by modulation instability.

The micro-structured optical fibre may have a zero dispersion wavelength between 1000 nm and 1100 nm. The zero dispersion wavelength may be the shortest zero dispersion wavelength in the transmission window of the material of which the fibre is made (e.g. silica).

The micro-structured optical fibre may be arranged to support propagation of the light in a single transverse mode at all wavelengths in the spectrum of wavelengths, for example, all wavelengths produced by four-wave mixing or supercontinuum generation from the pulses.

The micro-structured optical fibre may be arranged to support propagation of the pulses in a single transverse mode. An advantage of using a laser operating at its fundamental wavelength rather than operating frequency-doubled is that the fundamental wavelength will be longer than the second harmonic wavelength and it is then easier to fabricate the micro-structured fibre to be single mode. Prior-art systems utilising frequency-doubled microchip lasers operating at 532 nm produce pulses that propagate in higher-order modes of their micro-structured fibres; to propagate in the fundamental mode at that wavelength, the core of the micro-structured fibre would need to be less than 1 micron in diameter, which is difficult to fabricate.

The micro-structured optical fibre may be arranged to support propagation of light at all wavelengths in a single transverse mode.

It may be that more than 70%, more than 80%, more than 90% or even more than 95% of the light of the spectrum of wavelengths is in the lowest-order transverse mode supported by the fibre.

The micro-structured fibre may have a pitch greater than 2.5 microns, greater than 2.7 microns, or even greater than 2.9 microns.

The micro-structured fibre may have a core having a diameter greater than 4 microns, greater than 4.5 microns or even greater than 4.8 microns.

The micro-structured fibre may have a cladding region comprising an array of holes of diameter d and pitch $\Lambda$, in which d/$\Lambda$ is less than 0.7, less than 0.6, less than 0.5 or even less than 0.4.

The micro-structured fibre may have an effective nonlinear area greater than 8 $\mu m^2$, 9 $\mu m^2$, 12 $\mu m^2$, 14 $\mu m^2$ or even 15 $\mu m^2$. Thereby higher-power spectra are enabled.

The micro-structured fibre may be shorter than the pulse interaction length. As discussed elsewhere, the pulses may generate the light of the spectrum of wavelengths by a cascade of processes in the micro-structured fibre. It may be desirable to use such a shorter length to stop that cascade at a particular point, for example to obtain higher output powers at particular wavelengths, for example at four-wave-mixing wavelengths. The fibre length may be shorter than the interaction length of the pulses, calculated as the pulse walk-off length, because it may be that little additional generation of wavelengths takes place after that shorter length because of the effects of loss in the fibre.

The source may include a filter for selecting light of wavelengths in a subsection of the spectrum of wavelengths.

Also according to an embodiment of the invention there is provided a method of generating light of a spectrum of wavelengths extending over 500 nm, comprising operating a laser at or near its fundamental wavelength to provide pulses of light of a duration longer than 0.5 ns and guiding the pulses in a micro-structured optical fibre.

The light of the spectrum of wavelengths may be generated by a cascade of nonlinear processes, for example, four-wave-mixing followed by supercontinuum generation. We have found that using such cascaded nonlinearities can produce a spectrum having significant energy at visible, or even ultraviolet, wavelengths, for example from a microchip laser, for example operating at 1064 nm. Generation of a continuum extending over wavelengths shorter than 500 nm is particularly advantageous and has many potential uses. It has not been achieved by prior-art systems utilising frequency-doubled microchip lasers (for example, the lasers generating a supercontinuum from 532 nm light). However, we have found that generation of a spectrum extending into the visible or UV is possible by converting light from a monolithic laser operating at its fundamental wavelength, for example light from a microchip laser operating in the range 1000 nm to 1100 nm (for example 1064 nm) converted by four-wave mixing to a wavelength in the range 700 nm to 800 nm and then converted into a supercontinuum.

BRIEF DESCRIPTION OF DRAWINGS

Embodiments of the invention will now be described, by way of example only, with reference to the accompanying figures, of which:

FIG. 1 is a plot of:

Figure 2:
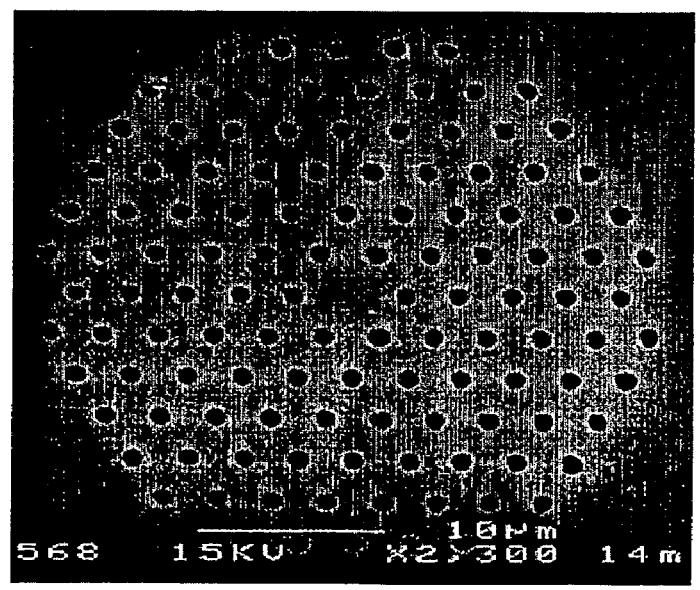
Figure 3:
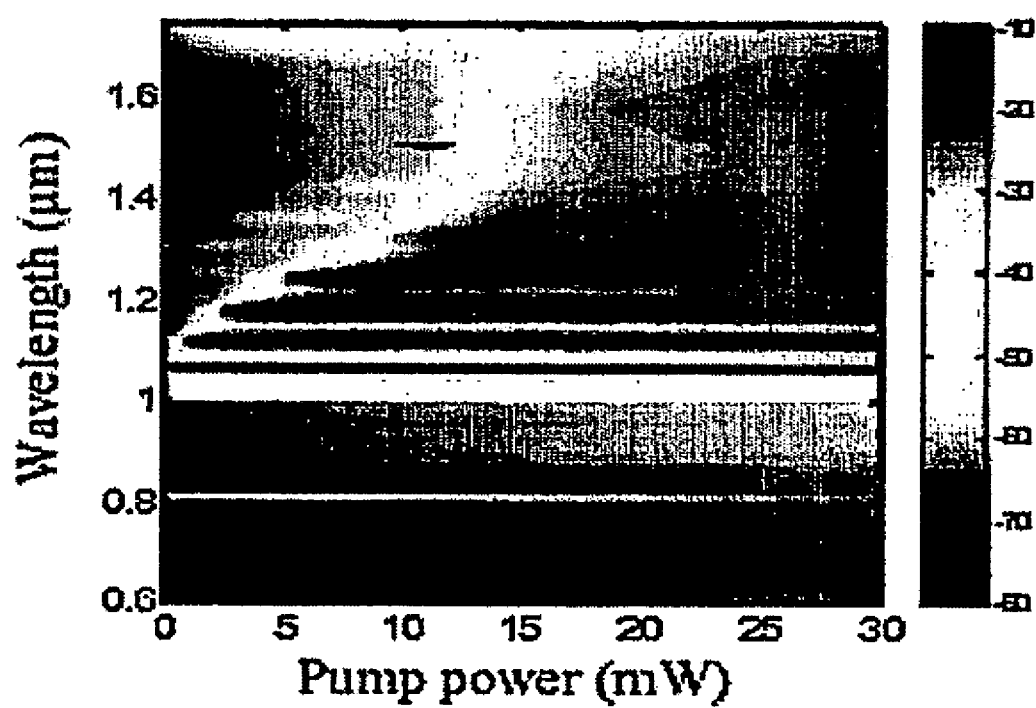
Figure 5:
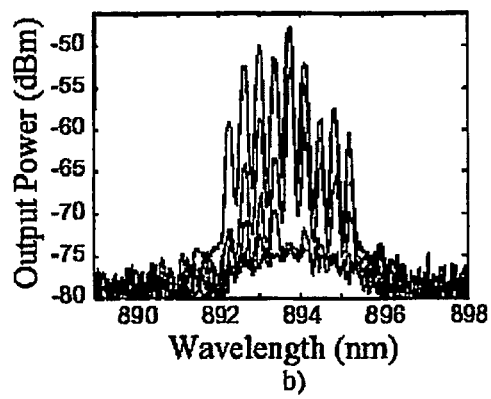
Figure 5:
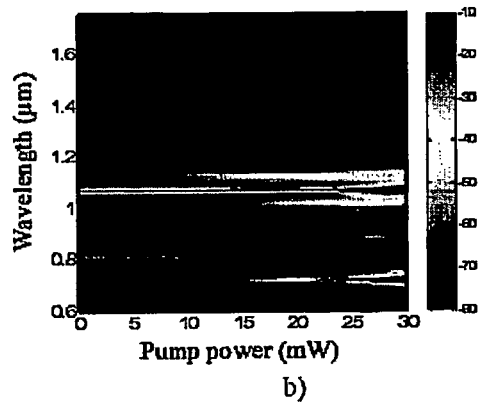
Figure 6:
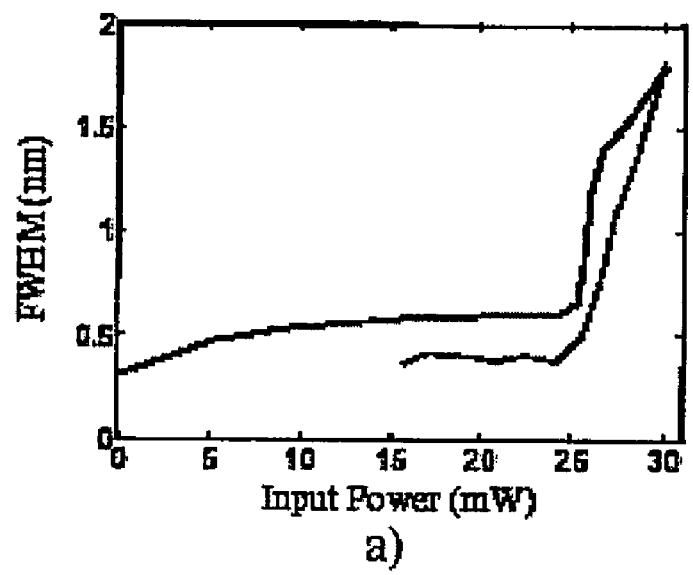
Figure 6:
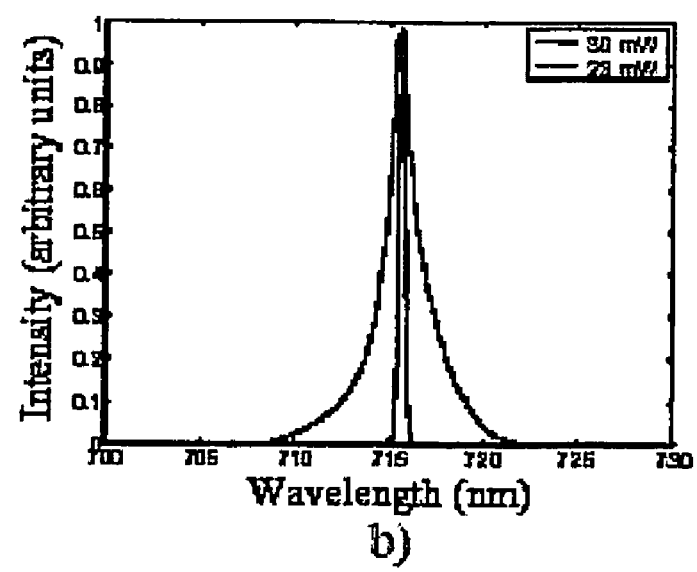
Figure 7:
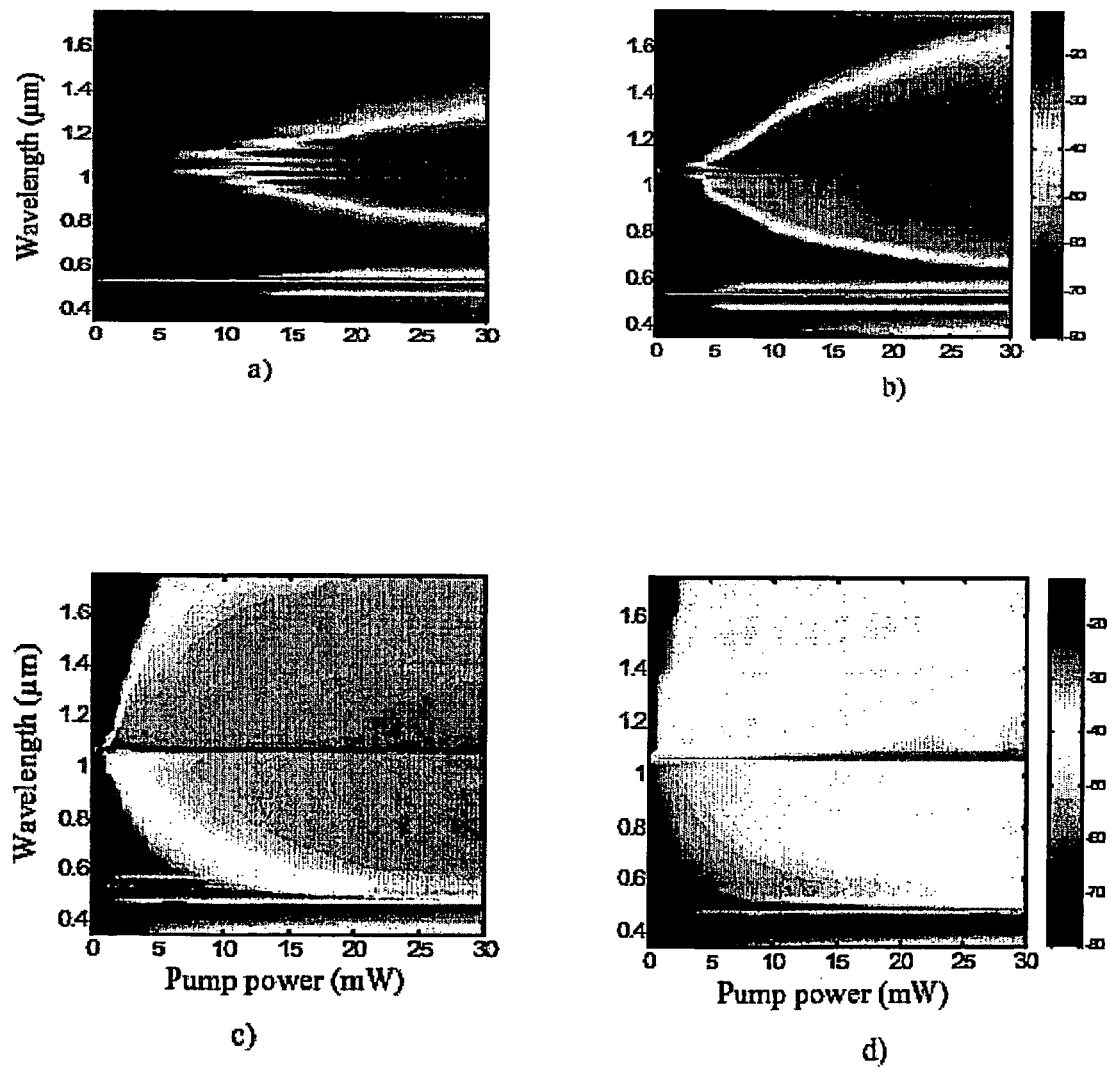
Figure 8:
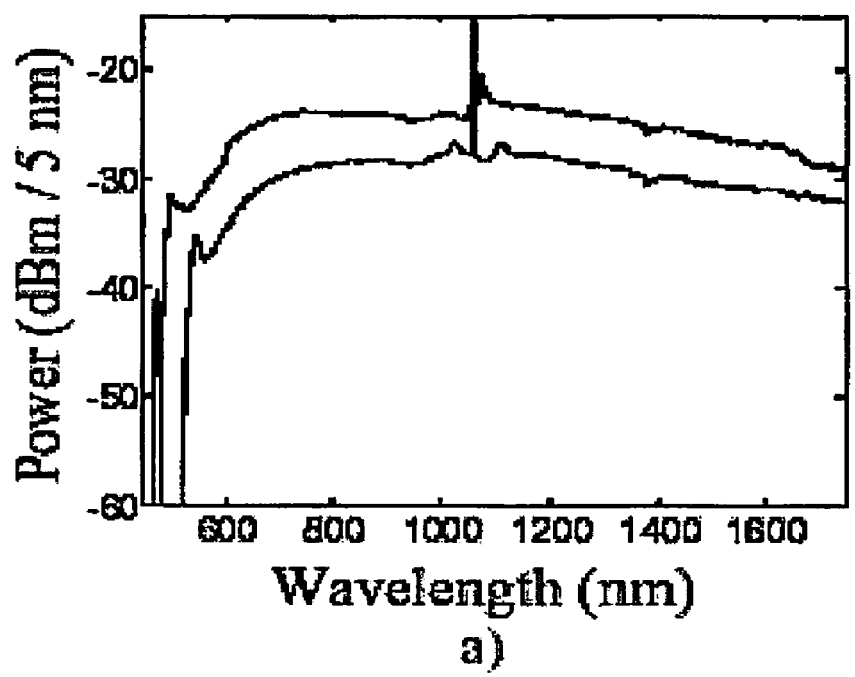
Figure 8:
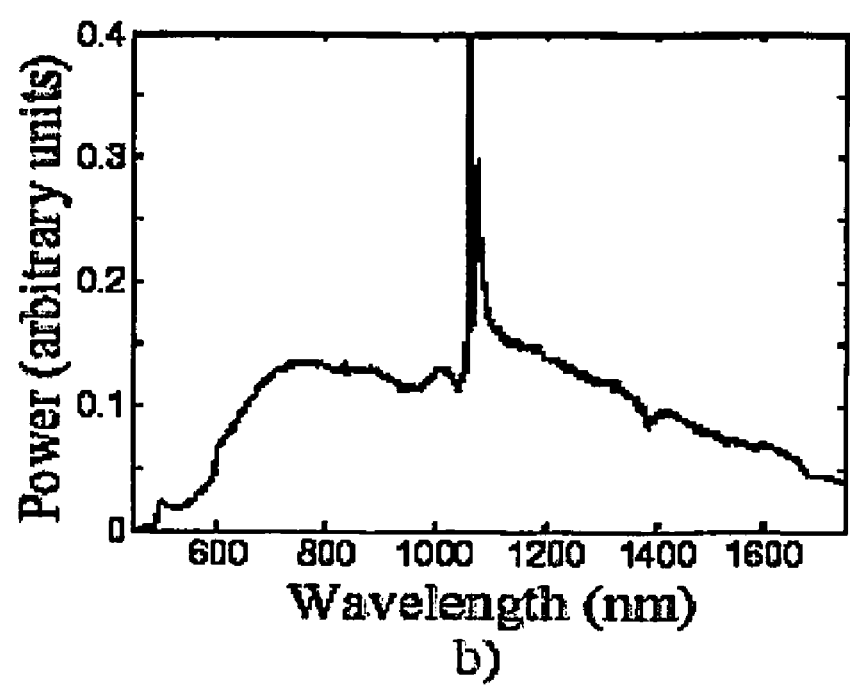
Figure 9:
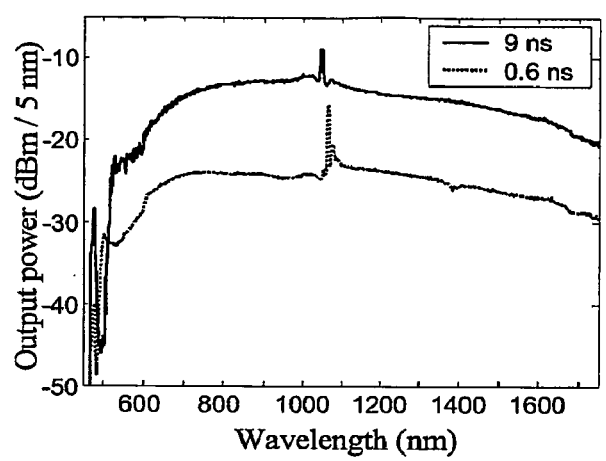
Figure 10:
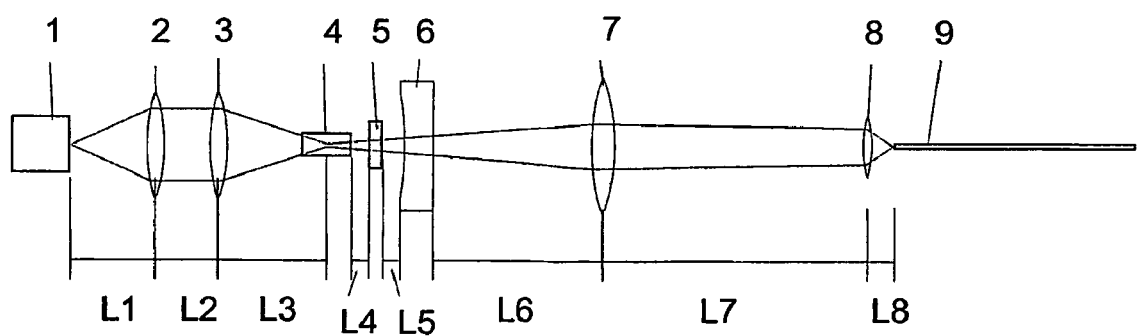

(a) Measured dispersion curves for several of the fibres considered (05A, 05E and 31G, corresponding to fibres O, P and G respectively in Table 1), together with the dispersion calculated for a regular PCF with round holes and pitch, $\Lambda$, 3 μm and d/$\Lambda$=0.3;

(b) Nonlinear phase matching conditions for $2\omega_{pump} \rightarrow \omega_{signal} + \omega_{idler}$ (Solid lines: calculated from the measured dispersion curve of fibre G with input powers: 14 W; 140 W; 1400 W. Circles: measured wavelengths and pump wavelength offset for fibres C, F, G, H, I, L (table 1));

FIG. 2 is a SEM of fibre O. $\Lambda$=2.97, d/$\Lambda$=0.39, $\lambda_0$=1065 nm;

FIG. 3 shows the measured output continuum spectra from 100 m of Nufern 1000-HP single mode fibre. (Scale in dBm/5 nm bandwidth);

FIG. 4 shows:

(a) the output spectra for 6 m length of PCF L showing strong optical parametric generation in the normal dispersion regime; and (b) the signal output for a 2.5 m length of PCF L with 2 mW pump and 9.5, 4.2, 1.4, 0.07 µW seed. (Pump only, no seed, black. 1 µW cw seed is 4000 photons in 600 ps. Spectrometer resolution 0.1 nm.);

FIG. 5 shows:

(a) the output spectra for 3 m lengths PCFs A, C, F, G, H, I showing strong optical parametric generation in the normal dispersion regime, input power 10-20 mW. Spectrometer resolution 0.2 nm. (Idler wavelengths longer than 1750 nm are not measured with this spectrometer); and b) the power dependence of spectra for fibre B generating $\lambda_{signal}$=716 nm;

FIG. 6 shows the detail of spectra from FIG. 5(b), fibre B. (Spectrometer resolution 0.2 nm):

(a) Line width (full width half maximum) of the output at the pump wavelength (1064 nm) and the OPG signal wavelength (716 nm); and (b) Normalised output spectra at the OPG signal wavelength for low and high input powers;

FIG. 7 shows the measured output continuum spectra from:

(a) 1 m, (b) 3 m, (c) 20 m and (d) 100 m of fibre P. False colour scale in dBm/5 nm bandwidth;

FIG. 8 shows the output spectra for 20 m lengths of fibres O and P at 30 mW input power:

(a) logarithmic scale, and (b) linear scale (arbitrary units, normalised to residual pump peak at 1064 nm);

FIG. 9 shows the output spectra Supercontinuum generation in 20 m of PCF P with short and long pulses; and FIG. 10 shows an embodiment of a supercontinuum light source according to the invention.

MODE(S) FOR CARRYING OUT THE INVENTION

Using techniques well known in the art, PCFs have been designed and fabricated with zero dispersion wavelengths close to, and on either side of, the wavelength of a Nd:YAG laser at 1064 nm. We have investigated in detail modulation instability, supercontinuum generation and optical parametric generation and amplification in these fibres when pumped with µJ energies in 600 ps pulses at 1064 nm. The use of Q-switched nanosecond pulses is a significant departure from previous work with modelocked femtosecond and pico-second lasers. The laser technology required for Q-switching is much simpler than mode-locking, enabling savings in size and cost. There are also many Nd- and Yb-doped lasers in the target wavelength range 1040-1070 nm, which can be directly diode pumped, and are thus compact and efficient.

Figure 1:
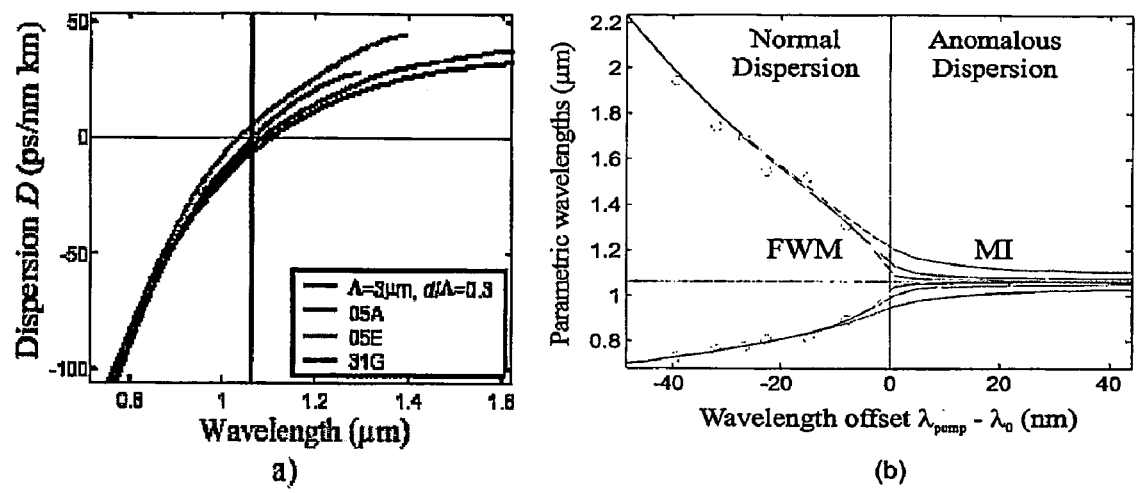

Most previous supercontinuum generation experiments have focused on the ultra-short pulse regime, with femtosecond pulses from mode locked lasers. In that case, self-phase modulation, solution effects and pulse walk-off are important considerations, and the propagation is described by the generalised nonlinear Schrödinger equation. Here we consider much longer pulses, where the propagation can be considered as quasi-CW. Neither the effects of dI/dt at the edges of the pulse, nor pulse walk-off between different wavelengths, are significant. In this case the major nonlinear process is phase matched fourwave mixing (FWM), to generate sidebands spaced at equal frequency intervals from the pump. Gain for these processes is provided by the nonlinear refractive index of silica, n2=2×10$^{-20}$ m$^2$/W. Phase matching and conservation of energy give the equations $$2k_{pump}=k_{signal}+k_{idler}+2\gamma P \quad (1)$$

and $$2\omega_{pump}=\omega_{signal}+\omega_{idler} \quad (2)$$

where $k_j$ are the wavevectors (propagation constants) of the modes, and $\omega_j$ the frequencies, of the pump, signal and idler waves; P is the pump power (in the quasi-CW case the peak pump power); and γ is the nonlinear coefficient of the fibre, $$\gamma = \frac{2\pi n_2}{\lambda A_{eff}} \quad (3)$$

where $A_{eff}$ is the effective area of the fibre and λ is the pump wavelength. These phase matching conditions will give the wavelengths for peak gain in a given fibre, and will depend on the chromatic dispersion of the fibre. We can measure or calculate the dispersion for different fibres and hence calculate the phase matching conditions (1). From numerical modelling of PCFs we obtain the propagation constants, $k_j$, directly, which may then be applied to (1). For measurements we only know the group velocity dispersion, the second derivative of the propagation constant. It is usual to expand the dispersion curve (as a function of optical frequency) as a Taylor series with dispersion coefficients $\beta_n$, from which the phase matching (1) can be calculated. For the PCFs considered here we included terms up to β6 in order to provide a reasonable fit and extrapolation for the measured group velocity dispersion curves (FIG. 1a). The Taylor coefficient $\beta_2$ (ps$^2$/km) is related to the engineering unit for group velocity dispersion, D (ps/nm km), by $$\beta_2 = \frac{\lambda^2}{2\pi c}D \quad (4)$$

Phase matched FWM wavelengths calculated from the measured dispersion of one PCF are shown in FIG. 1(b) as a function of the pump wavelength offset from the zero dispersion wavelength. There are three important regions: a) $\lambda_{pump} \ll \lambda_0$, b) $\lambda_{pump} \lesssim \lambda_0$, c) $\lambda_{pump} > \lambda_0$.

Taking these in reverse order; case c) (the right hand half of FIG. 1(b)) shows a strongly power-dependent phase matching of FWM peaks close to the pump wavelength. A non-zero value of γP is required for solutions of (1) in this region. This is the well known phenomenon of modulation instability (MI) which occurs in the anomalous dispersion regime of all fibres. The gain peaks are relatively broad, and the central frequencies depend mostly on the group velocity dispersion, $\beta_2$, and only weakly on the higher order dispersion.

In case b) (the left hand half of FIG. 1(b)) there is a largely power-independent phase matching of widely spaced FWM peaks. Solutions of (1) in this region are present even for zero power, but only for non-zero higher order dispersion (even terms only, $\beta_4$, $\beta_6$ etc, in the Taylor expansion). The gain peaks are relatively narrow, and the central frequencies depend strongly on the higher order dispersion.

In case a) (beyond the left side of FIG. 1(b)) there is no phase matching for FWM. The boundary between a) and b) has an experimental and a theoretical position. It can be seen from FIG. 1(b) that the idler wavelength is shifted further beyond 2 μm as the offset of the pump from $\lambda_0$ is increased. Idler signals generated beyond 2.2 μm cannot be detected because of the absorption of silica increases rapidly in this wavelength range. Even neglecting absorption, an idealised fibre shows FWM phase matching branches which curve back on themselves, giving a limit to the maximum wavelength offset at which FWM can occur.

Widely spaced FWM peaks (case b) have been discussed frequently, but were only recently observed, using 60 ps pulses at 647 nm from a mode locked $Kr^+$ laser in a PCF with zero dispersion wavelength at 652 nm, by the current inventors and others (see for example J. D. Harvey, R. Leonhardt, K. L. G. Wong, J. C. Knight, W. J. Wadsworth and P. St. J. Russell, "An optical parametric oscillator in the visible using PCF," CLEO 2003, paper CMR3 (2003)). In this work we investigate the FWM/MI phenomena in greater detail, with pulses an order of magnitude longer, 600 ps, and at wavelength, 1064 nm, of great engineering importance, given the abundance of different Nd- and Yb-doped lasers available.

As well as FWM/MI gain, all silica fibres will display Raman gain, at the characteristic shift of 13 THz. As this is not a phase matched process, it will occur in all fibres and is largely unaffected by differences in the fibre dispersion. Where phase matching is available, FWM/MI gain is generally higher than Raman gain in silica, so significant Raman effects are only expected to be observed when FWM/MI gain is not present (i.e. for case a).

Many PCFs were fabricated with zero dispersion wavelengths to either side of 1064 nm. The fibres have a 125 μm outside diameter and 250 μm acrylate buffer for compatibility with standard fibre cleavers, strippers, mechanical holders and adaptors. All of the fibres have nominally the same hole-to-hole pitch, $\Lambda$=3 μm, but with different hole diameters, d, from d/$\Lambda$=0.3 to d/$\Lambda$=0.5, corresponding to a core diameter of approximately 5 μm. For larger holes the zero dispersion wavelength lies to shorter wavelengths. Measured zero dispersion wavelengths, $\lambda_0$, span from 1040 nm to 0.1105 nm. No specific attempt was made during fabrication to reduce fibre losses, and as a consequence these were relatively high, being 4.5 dB/km at 1550 nm, and 12 dB/km at 1064 nm, with 110 dB/km at the peak of the $OH^-$ absorption at 1380 nm. A scanning electron micrograph of a representative fibre is shown in FIG. 2. For comparison, a conventional step-index fibre, Nufern 1000-HP, which has a single-mode cut-off wavelength of 920 nm and mode-field diameter 6.2 μm at 1060 nm, was also investigated.

Nonlinear interactions in the fibres were observed by pumping with 600 ps pulses from a passively Q-switched Nd:YAG laser (JDS Uniphase model number NP-10620-100). The average power delivered to the fibre was 30 mW, with a pulse repetition rate of 7.25 kHz, corresponding to a pulse energy of 4.1 μJ and a peak power of 6.9 kW. Coupling efficiency into the various single-mode fibres was 35-50%. This pump laser is low-cost and extremely compact with a laser head 100×22×32 mm which adds a practical usefulness to the scientific interest in wavelength conversion and continuum generation. Power input to the fibre under test was controlled using a mica waveplate and crystal polarizer. The polarization of the input to the fibre was fixed to be vertical at all times. Input and output powers were measured with a thermal power meter because of its flat spectral response over the wide range of output wavelengths generated. Output spectra were measured with an optical spectrum analyser (Ando AO-6315B). The spectral resolution was set to 5 nm except where stated otherwise. Powers at discrete parametric wavelengths were measured by dispersing the output with an SF11 equilateral prism and measuring the individual beams with a thermal power meter. For measurement of parametric gain, the output from a fibre coupled CW diode laser was introduced into the input beam by reflection from an uncoated glass plate at 45°. The polarization of the diode was adjusted for maximum reflection from the plate, which corresponds to predominately vertical polarization, parallel to the pump light polarization. The seed power coupled into the fibre was measured at the fibre output using a low power photodiode detector calibrated at the seed wavelength.

Table 1 shows the optical data for several PCFs considered in this paper. The dispersion was measured using a low-coherence interferometric technique. The optical parametric generation (OPG) wavelengths refer to the measured output wavelengths when a short, 1 to 3 m, length of fibre is pumped with pulses at 1064 nm. All the fibres listed in table 1, except for fibre P, are endlessly single mode; there is only one guided mode whatever the wavelength. Fibre P which has hole diameter d/$\Lambda$>0.4 is not endlessly single mode, however the single mode cut-off wavelength is <650 nm, so it is single mode at the wavelengths of interest. Measured dispersion curves for a selection of the fibres are shown in FIG. 1(a), together with the curve calculated for an idealised fibre with $\Lambda$=3 μm d/$\Lambda$=0.3. The different regimes of nonlinear interaction described above are all accessible with the range of fibres available; a) $\lambda_{pump} \ll \lambda_0$, as represented by the Nufern 1000-HP conventional step-index fibre, b) $\lambda_{pump} \lesssim \lambda_0$, as represented by PCF L, c) $\lambda_{pump} > \lambda_0$, as represented by PCF P.

For each case the evolution of the output spectrum with input power and fibre length is discussed in the sections below:

Case a) $\lambda_{pump} \ll \lambda_0$

The step-index fibre 1000-HP has a measured zero dispersion wavelength $\lambda_0$=1440 nm. The pump wavelength offset is very large, −376 nm, which lies in the region where there is no nonlinear phase matching. The dispersion at the pump wavelength, 1064 nm, is −37 ps/nm km. The evolution of the measured output spectrum for 100 m of this fibre with input power is shown in FIG. 3. There is significant Raman generation, with several orders of Raman Stokes lines visible. The spectrum is one-sided, with no generation of wavelengths shorter than the pump. This is a clear indication of the absence of parametric processes, as is expected.

Case b) $\lambda_{pump} \lesssim \lambda_0$

Figure 4:
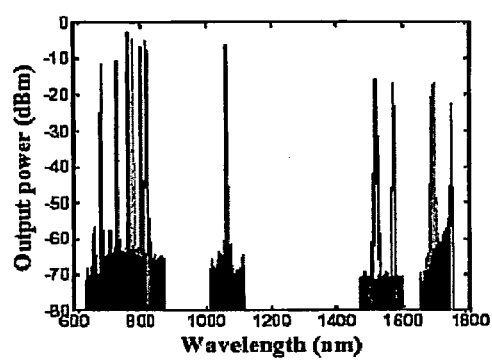
Figure 4:
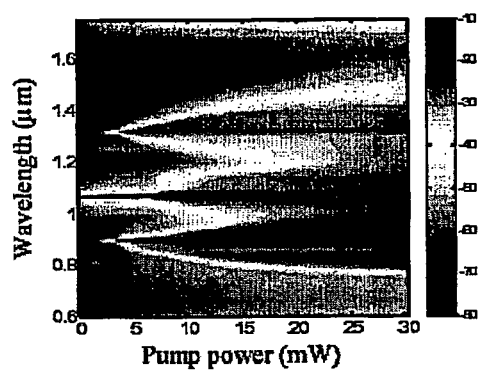

PCF L has a measured zero dispersion wavelength $\lambda_0$=1069 nm. The pump wavelength offset is small, −5 nm, which lies in the region where there is phase matching of widely spaced wavelengths, with little power dependence (FWM, the left half of FIG. 1(b). The dispersion at the pump wavelength is also small, just −1 ps/nm km. The evolution of the measured output spectrum with input power is shown in FIG. 4(a) for 6 m of this fibre. At low power, two distinct parametric wavelengths are generated at 895 and 1315 nm, equally spaced in energy about the pump wavelength. This is as expected from phase matching calculations. As the pump power is increased further, there is spectral broadening about the pump, signal and idler wavelengths. For other PCFs, A-N, with the pump offset from $\lambda_0$ by up to −40 nm, similar parametric generation is seen, with signal wavelengths ranging from 686 nm to 975 nm, and idler wavelengths ranging from 1168 nm to beyond 1900 nm (table 1, FIG. 5(a)).

The broadening of the generated parametric peaks seen at high power in FIG. 4(a) is considerably reduced for fibres generating more widely-spaced FWM wavelengths. For example, FIG. 5(b) shows the output for fibre B. Here there is very little broadening of the pump and signal wavelengths as the pump power is increased. This is because the right-hand side of equation (1) has a steep slope (with respect to changing signal wavelength) close to the exact phase-matching solution, and hence the parametric gain peak is narrow. The spectrum of the 716 nm signal is shown in FIG. 6 for medium and high input power, together with the evolution of the bandwidth of the 716 nm and 1064 peaks with pump power. The bandwidths are unchanged for pump powers up to 25 mW, when both increase to 1.8 nm FWHM at 30 mW pump power. The parametric conversion efficiency in this fibre was determined by measuring the power of the signal and pump beams dispersed by a prism. For 30 mW input power, the total output was 11 mW, of which 8.3 mW was pump at 1064 nm and 2.5 mW was signal at 716 nm, a conversion of 22%. No radiation was measured at the expected idler wavelength of 2.07 μm. We believe that confinement loss at long wavelengths is the reason for the absence of this wavelength in the output. Using fibre C with a smaller pump wavelength offset, the FWM wavelengths are slightly closer at 732 nm (measured) and 1945 nm (inferred from the signal wavelength). In this case, output radiation at the idler wavelength was observed. For a 3 m length at a pump power of 30 mW, the total output power was 13 mW, of which 8.0 mW was pump at 1064 nm; 4.5 mW was signal at 732 nm, a conversion of 35%; and 0.43 mW was idler at 1945 nm, a conversion of 3%.

The wavelengths of parametric generation measured in fibres C, F, G, H, I, L are plotted in FIG. 1(b) against the pump wavelength offset from the measured $\lambda_0$ for each fibre. Good agreement is seen between these points and the lines calculated by equations (1) and 2 from the measured dispersion of fibre G.

Parametric gain at 1315 nm was measured for a 2.5 m length of fibre L using a CW diode laser probe beam. At a coupled pump power of 4 mW (peak power 920 W), where the spontaneous parametric generation is still low, a gain of >55 dB was measured for a seed power of 15 μW at 1315 nm. The threshold for observation of light at the signal wavelength (895 nm) was lowered from 2 mW (460 W peak) pump power for unseeded spontaneous generation, to 0.95 mW (218 W peak) for a seed power of 11 μW at 1315 nm. At 2 mW (460 W peak) pump power, seeded parametric generation was observed for the lowest achievable seed power of 0.07 μW, which corresponds to fewer than 300 photons during the 600 ps gain period, FIG. 4(b). The modes seen in the seeded signal correspond to the longitudinal modes of the seed diode laser at 1310 nm. The pump and seed powers required are sufficiently low that one might reasonably expect to generate CW parametric oscillation using a longer fibre with feedback.

Case c) $\lambda_{pump} > \lambda_0$

PCF P has a measured zero dispersion wavelength $\lambda_0 = 1039$ nm. The pump wavelength offset is +25 nm, which lies in the region where there is power-dependent phase matching of closely spaced wavelengths (MI, the right half of FIG. 1(b)). The dispersion at the pump wavelength is +5 ps/nm km. The evolution of the measured output spectra for 1 m, 3 m, 20 m and 100 m of this fibre with input power is shown in FIG. 7. For short 1 m and 3 m lengths, the symmetrical MI peaks are clearly visible dose on either side of the pump wavelength. At low power (5-7 mW) there is a shift of the generated MI wavelengths with input power as expected from equation (1), but once there is significant power in the MI peaks the wavelengths become fixed through saturation. For long 20 m and 100 m lengths of fibre, MI is only visible at the very lowest powers, <2 mW. The wavelengths generated are much closer to the pump (scarcely separated from the pump for 100 m), as expected from the lower pump power at which they are observed, and again the positions of the peaks stabilise at high power. At high power the output bandwidth grows into a broad and extremely flat continuum, spanning from approximately 500 nm to beyond the limit of the OSA at 1750 nm. Other detectors were used to show that there is certainly power in the spectrum beyond 1900 nm. Representative high power spectra for 20 m lengths of two fibres are shown in FIG. 8 on both linear and logarithmic scales. The lack of spectral features in the flat continuum is in marked contrast to continua generated in PCF with femto-second pulses. Short and medium-term temporal stability is also good, as we have applied this continuum as a source for interferometric measurements without the need to monitor their input power. As the spectrum is already extremely broad after 20 m of fibre, little bandwidth is gained from further propagation to 100 m. In fact, the main effect of further propagation is power loss. The propagation is not, however, passive linear propagation of the broad spectrum generated in the first 20 m of fibre. This can be seen by looking at the dip in the output spectrum caused by the OH absorption of the fibre at 1380 nm which amounts to 8 dB for passive fibre propagation from 20 to 100 m. The actual dip measured in the spectrum after 100 m is only 4 dB, suggesting that there is sufficient power in the continuum on either side of the absorption to be able to continue to re-distribute energy into this region as energy is lost to absorption.

We have demonstrated a new dispersion regime for single mode fibres, where the zero-GVD wavelength is close to 1064 nm. This is applied to nonlinear interactions of sub-nanosecond Q-switched laser pulses, either to produce a compact source of broad, flat, spectrally and spatially bright single mode continuum radiation, or for compact efficient wavelength conversion to produce pulses at a selected wavelength in the near IR. A broad, flat and compact continuum source has obvious application to spectral testing of fibre components (for which it already proving its power and versatility in our laboratory) and spectral analysis of chemical and biological samples. Pulsed narrow band sources at other selected wavelengths increase the range of wavelengths easily available for nonlinear identification and detection in schemes such as two-photon fluorescence, as well as providing pump sources for nonlinear interactions in fibres at other interesting wavelengths. For example, pulses generated at 750 nm could be launched into nonlinear dispersion shifted PCF designed for continuum generation with Ti:sapphire lasers, and yield a continuum spanning further into the visible than is possible when starting at 1064 nm in the IR. The observed nonlinearities fit to well understood physical processes of FWM and MI, and the control of dispersion readily available with PCF technology has enabled application to a wavelength of great importance in laser engineering. Further consideration of fibre dispersion may help to improve further on the results presented here.

In a further development of the work described above, we now report strong FWM and supercontinuum generation in pulses several orders of magnitude longer than those usually considered. In this quasi-cw regime the (peak power)×(interaction length) required is shown to be less than 500 W·m. As discussed above, the continuum produced is applicable to spectroscopy and photonic device testing. FWM can be used to generate intense pulses at a particular desired wavelength, for two-photon fluorescence microscopy or for further non-linear conversion.

Here we take the next step towards true-cw operation with single-mode parametric and continuum conversion of nanosecond Q-switched laser pulses of 102 to 103 W peak power. As well as the scientific interest, this is of practical importance because of the compact and low-cost nature of Q-switched Nd lasers.

We chose a passively Q-switched Nd:YAG microchip laser (short pulses, 0.6 ns at 7.25 kHz, 30 mW, 1064 nm) for its compactness and low cost, and an actively Q-switched Nd:YLF laser (long pulses, 6-30 ns at 1 Hz to 50 kHz, 250 mW, 1047 nm, donated by Lightwave Electronics Inc.) for its stability and flexibility. FIG. 9(a) shows the output spectra for PCF P with $\lambda_0$=1038 nm, and anomalous dispersion at both pump wavelengths, each laser running at 7.25 kHz and full power. The continuum is broad and flat in both cases, the higher average power of the long pulse laser giving a higher spectral density. FIG. 2b shows the output from six different PCFs with $\lambda_0$=1080-1105 nm using the short pulse laser, in the normal dispersion regime. Strong four-wave mixing (FWM) is seen at widely spaced wavelengths.

Furthermore, for PCF O, with normal dispersion at 1047 nm, the long-pulse laser generated isolated FWM peaks. This is equivalent to the FWM of FIG. 4 but for much longer pulses. Pulses of approximately 20 ns duration at 30 kHz were used to produce FWM peaks close to 1400 nm and close to 835 nm.

These results point to the possibility of true cw OPO oscillation in fibre ring cavities at threshold powers (~1 W) within reach of current compact laser systems.

An Example of a Broad Spectrum Light Source:

With reference to FIG. 10 the following example describes one specific example of a light source according to the invention. The super continuum light source shown in FIG. 10 consists of three sections. The first section (elements 1 through 6 in FIG. 10) forms a q-switched Nd:YAG laser emitting light at 1064 nm with a pulse width of from 2 ns to 5 ns (other pulse lengths, smaller or greater than the 2-5 ns range, may e.g. be implemented by changing the cavity length). The second section (elements 7 and 8 in FIG. 10) forms an optical coupling section for coupling the light from the Nd:YAG laser into the third section. The third section (element 9 in FIG. 10) is an optical nonlinear photonic crystal fibre.

The white light source as shown in FIG. 10 is assembled using a diode laser 1 emitting up to 3 W of light in continuous wave mode at a wavelength of 808 nm (JDSU, SDL-2472-P1). An aspheric lens 2 with a focal length of 8 mm (Thorlabs, C240™) is aligned in front of diode laser 1 in a distance L1 of approximately 8 mm in order to focus the emitted light in a distance of 1 meter from diode laser 1. A second aspheric lens 3 with a focal length of 8 mm (Thorlabs, C240™) is positioned on axis with lens 2 in a distance L2 of 10 mm from lens 2. A 5 mm thick Nd:YAG crystal 4 (1% Nd) with a 99.8% reflective coating for 1064 nm light in one end and an anti-reflective coating for 1064 nm light in the other end is positioned on axis with lens 3 at a distance L3 of 8 mm from lens 3. A 1 mm thick Cr4+:YAG crystal 5 with 70% initial transmission and anti-reflective coatings for 1064 nm light on both optical surfaces is positioned on axis with Nd:YAG crystal 4 in a distance L4 of 0.5 mm from Nd:YAG crystal 4. A laser mirror 6 with a 90% reflective coating for 1064 nm light and a curvature of 500 mm (CASIX, NDO0112) is positioned on axis with Cr4+:YAG crystal 5 in a distance L5 of 0.5 mm from Cr4+:YAG crystal 5. With light being emitted from the laser 1, the mirror 6 has to be aligned in order for laser light to be emitted at 1064 nm from the elements 4 through 6. The distance L3 can be optimized for maximum output power out of mirror 6 of light at 1064 nm. A lens 7 with a focal length of 75 mm is positioned on axis with mirror 6 at a distance L6 of 40 mm from mirror 6. A lens 8 with a focal length of 2.97 mm (Lightpath, 350660) is positioned on axis with lens 7 at a distance L7 of 125 mm from lens 7. An optical nonlinear photonic crystal fibre 9 with a mode field diameter of 4.0 µm, a numerical aperture of 0.20 and a zero-dispersion wavelength at 1040 nm (Crystal Fibre A/S, Birkerød, Denmark, NL-4,8-1040) is positioned with the input facet on axis with lens 8 in a distance L8 of 3 mm from lens 8. The position of the two lenses 7 and 8, and the fibre 9 have to be aligned in order to maximize the coupling of light at 1064 nm into the fibre.

The fabrication of photonic crystal fibres by drawing from a preform is e.g. discussed by Bjarklev, Broeng and Bjarklev in "Photonic Crystal Fibres", Kluwer Academic Press, 2003, chapter 4, pp. 115-130.

Some preferred embodiments have been shown in the foregoing, but it should be stressed that the invention is not limited to these, but may be embodied in other ways within the subject-matter defined in the following claims.

TABLE 1

Parametric generation wavelengths for the fibres studied.

| label | A | B | C | D | E | F | G | H | I | J | K | L | M | N | O | P |
|---|---|---|---|---|---|---|---|---|---|---|---|---|---|---|---|---|
| $\lambda_0$ | — | — | 1103 | — | — | 1095 | 1090 | 1087 | 1078 | — | — | 1069 | — | — | 1065 | 1039 |
| $\lambda_{signal}$ | 686 | 716 | 732 | 737 | 740 | 765 | 775 | 804 | 818 | 824 | 856 | 895 | 918 | 975 | — | — |
| $\lambda_{idler}$ | 2367 | 2068 | 1945 | 1911 | 1891 | 1745 | 1694 | 1572 | 1521 | 1497 | 1403 | 1315 | 1266 | 1168 | — | — |

$\lambda_0$, measured zero dispersion wavelength (nm);
$\lambda_{signal}$, measured OPG signal wavelength (nn);
$\lambda_{idler}$, measured OPG idler wavelength (nm)
— shaded values calculated from $\lambda_0$ (nm).

The invention claimed is:

1. A source of light of a spectrum of wavelengths extending over more than 300 nm, the source comprising:

a laser, which operates at or near its fundamental wavelength and produces pulses of a duration longer than 0.5 ns; and a micro-structured optical fiber arranged to guide the pulses in a core, wherein said core has a diameter greater than 4 microns, the light is generated by the pulses in the core; and wherein more than 80% of the light of the spectrum of wavelengths is in the lowest order transverse mode supported by the fiber.

2. The source as claimed in claim 1, wherein the laser is a monolithic laser.

3. The source as claimed in claim 2, wherein the monolithic laser is a microchip laser.

4. The source as claimed in claim 1, wherein the pulses of light are of a duration of more than 1 ns.

5. The source as claimed in claim 1, wherein the pulses have a peak power of less than 50 KW.

6. The source as claimed in claim 1, wherein the pulses have a peak power and interact with the fiber over a length of the fiber such that the peak power times the interaction length is less than 2 kWm.

7. The source as claimed in claim 1, wherein the spectrum extends over more than 500 nm.

8. The source as claimed in claim 1, wherein the fundamental wavelength is longer than 600 nm.

9. The source as claimed in claim 1, wherein the fundamental wavelength ranges from about 1000 nm to 1100 nm.

10. The source as claimed in claim 1, wherein the micro-structured optical fiber has a zero dispersion wavelength $\lambda_0$ and the operating wavelength of the laser is less than the zero dispersion wavelength.

11. The source as claimed in claim 1, wherein the micro-structured optical fiber has a zero dispersion wavelength $\lambda_0$ and the operating wavelength of the laser is greater than the zero dispersion wavelength.

12. The source as claimed in claim 1, wherein the micro-structured optical fiber has a zero dispersion wavelength between 1000 nm and 1100 nm.

13. The source as claimed in claim 1, wherein the micro-structured optical fiber is arranged to support propagation of the pulses in a single transverse mode.

14. The source as claimed in claim 1, wherein the micro-structured optical fiber is arranged to support propagation of light at all wavelengths in a single transverse mode.

15. The source as claimed in claim 1, wherein the micro-structured fiber has a hole-to-hole pitch greater than 2.5 microns.

16. The source as claimed in claim 1, wherein the micro-structured fiber includes a core having a diameter greater than 4.5 microns.

17. The source as claimed in claim 1, wherein the micro-structured fiber includes a cladding region comprising an array of holes of diameter d and hole-to-hole pitch $\Lambda$, in which $d/\Lambda$ is less than 0.7.

18. The source as claimed in claim 1, wherein the micro-structured fiber includes an effective nonlinear area greater than 8 $\mu m^2$.

19. A source of light of a spectrum of wavelengths extending over more than 300 nm, the source comprising:

a laser, which operates at or near its fundamental wavelength in the range 1000 nm to 1100 nm and produces pulses of a duration longer than 0.5 ns; and a micro-structured optical fiber arranged to guide the pulses, wherein said optical fiber has a core having a diameter greater than 4 microns;

wherein the light is generated by the pulses in the fiber, and the micro-structured optical fiber has a zero dispersion wavelength between 1000 nm and 1100 nm;

wherein the micro-structured optical fiber is arranged to support propagation of the pulses in a single transverse mode.

20. A method of generating light of a spectrum of wavelengths extending over 300 nm, the method comprising:

operating a monolithic laser at or near its fundamental wavelength to provide pulses of light of a duration longer than 0.5 ns; and guiding the pulses in a core of a micro-structured optical fiber, which said core is arranged to have diameter greater than 4 microns to have more than 80% of the generated light of the spectrum of wavelengths in the lowest order transverse mode supported by the fiber.

* * * * *